US007828696B2

(12) United States Patent
Choi

(10) Patent No.: US 7,828,696 B2
(45) Date of Patent: Nov. 9, 2010

(54) METHOD FOR CONTROLLING ENGINE TORQUE OF HYBRID ELECTRIC VEHICLE WITH ELECTRONIC THROTTLE CONTROL

(75) Inventor: Yong Kak Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 460 days.

(21) Appl. No.: 11/940,406

(22) Filed: Nov. 15, 2007

(65) Prior Publication Data

US 2008/0146411 A1    Jun. 19, 2008

(30) Foreign Application Priority Data

Dec. 15, 2006    (KR)    ............... 10-2006-0128882

(51) Int. Cl.
*B60W 10/02*    (2006.01)
(52) U.S. Cl. .................. 477/180; 477/5; 903/946
(58) Field of Classification Search ............ None
See application file for complete search history.

(56) References Cited

U.S. PATENT DOCUMENTS 6,554,736 B2 *    4/2003    Takano et al. .................. 477/5
6,776,739 B2 *    8/2004    Eguchi et al. ............... 477/107
7,080,617 B2 *    7/2006    You .......................... 123/179.4

FOREIGN PATENT DOCUMENTS

| JP | 11-148388 | 6/1999 |
| JP | 2000-097069 | 4/2000 |
| JP | 2001-224104 | 8/2001 |
| JP | 2003-083143 | 3/2003 |
| KR | 102004007183 | 8/2004 |
| KR | 102005001927 | 3/2005 |

* cited by examiner

*Primary Examiner*—David D Le
*Assistant Examiner*—Justin Holmes
(74) *Attorney, Agent, or Firm*—Morgan, Lewis & Bockius LLP

(57) ABSTRACT

A method for controlling engine torque of a hybrid electric vehicle with an electronic throttle control when an engine is restarted after an idle-stop state includes: transmitting torque restriction information to an engine control unit, outputting a restricted torque from the engine control unit using the torque restriction information, transmitting an input torque of the engine to a continuously variable transmission by a clutch operation according to a control of the engine control unit, and supplying a clutch control hydraulic pressure based on the input torque.

1 Claim, 3 Drawing Sheets

METHOD FOR CONTROLLING ENGINE TORQUE OF HYBRID ELECTRIC VEHICLE WITH ELECTRONIC THROTTLE CONTROL

CROSS-REFERENCE TO RELATED APPLICATION

This application claims priority under 35 U.S.C. §119(a) of Korean Patent Application No. 10-2006-0128882 filed on Dec. 15, 2006, the entire contents of which are incorporated herein by reference.

BACKGROUND OF THE INVENTION (a) Field of the Invention

The present invention relates to a method for controlling engine torque of a hybrid electric vehicle (HEV).

(b) Background Art

As is generally known in the art, a hybrid electric vehicle (HEV) is a vehicle with a gasoline engine and an electronic throttle control (ETC) device. An electric motor is connected to the ETC. The vehicle charges a battery with energy recovered by the motor.

HEVs are intended to have good fuel efficiency and exhaust performance and, in order to accomplish such an object, it is necessary to minimize consumption of engine power. Methods for minimizing consumption of engine power include a drive control method for driving at an optimum driving point of the engine by a motor assist, an idle-stop control method, and the like.

The motor assists the restart of the engine when releasing the idle-stop state. After the idle-stop state is released, a motor torque is generated, and the engine receives the motor torque to perform an initial injection and ignition, thus generating an engine torque.

An engine RPM and torque thus generated assist an oil pressure generation of a transmission to generate a clutch hydraulic pressure, and the generated clutch hydraulic pressure operates the clutch to transmit power to the wheels.

However, one of the most significant problems of the hybrid electric vehicle at present is a delay in the vehicle start after the release of the idle-stop state. The reason for the delay is the time taken to generate the engine RPM and the time required for generating the oil pressure of the transmission to control the clutch.

Accordingly, a control method of the motor, engine and transmission is necessary in the vehicle start process from the idle-stop state.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

A method for controlling engine torque of a hybrid electric vehicle with an electronic throttle control when an engine is restarted after an idle-stop state includes: transmitting torque restriction information to an engine control unit, outputting a restricted torque from the engine control unit using the torque restriction information, transmitting an input torque of the engine to a continuously variable transmission by a clutch operation according to a control of the engine control unit, and supplying a clutch control hydraulic pressure based on the input torque.

The torque restriction information is based on engine coolant temperature. The torque restriction information is transmitted until a clutch operates. If the clutch does not operate, the torque restriction is released after a predetermined time.

Figure 1:
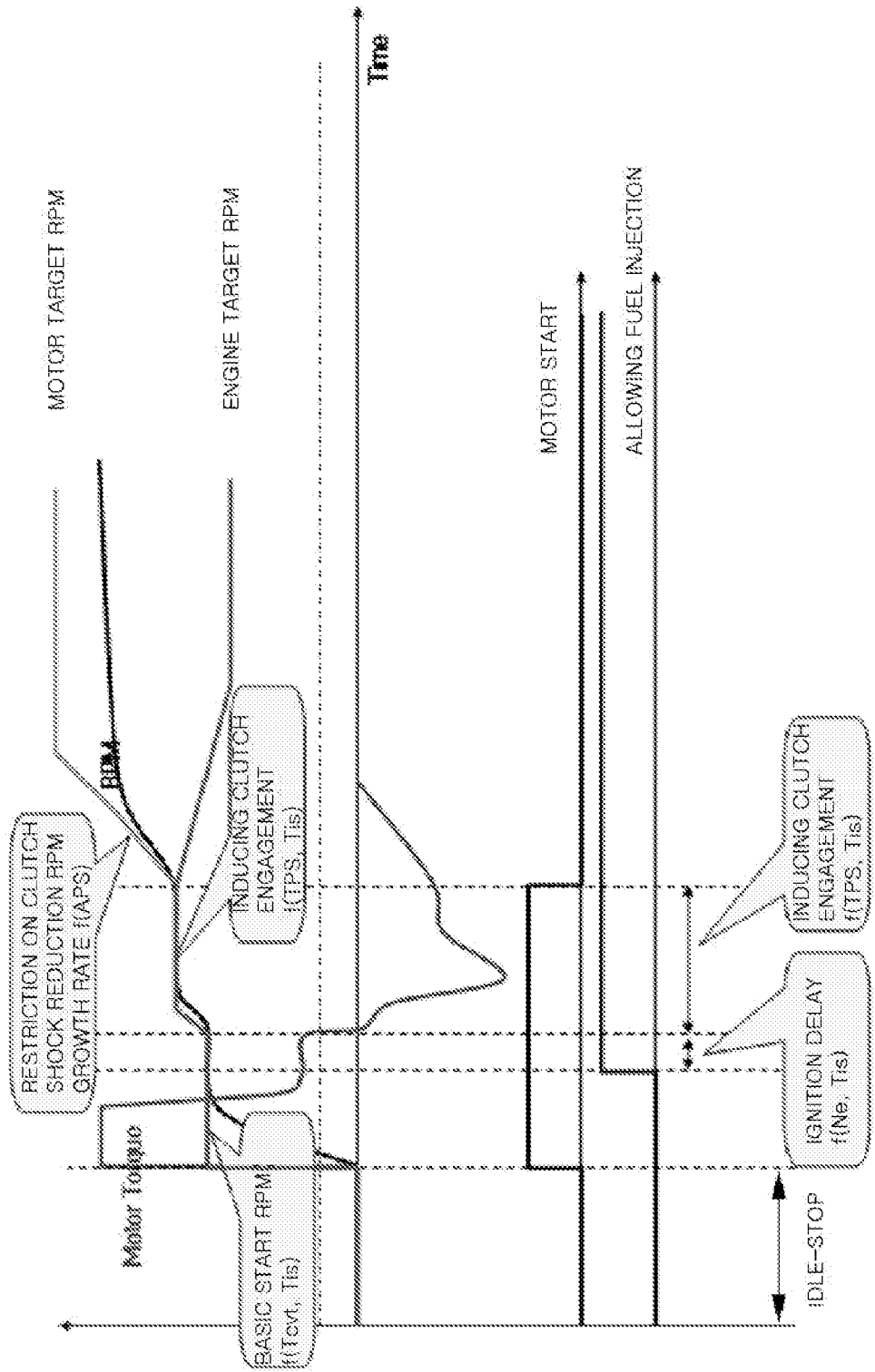
FIG. 1 is a schematic diagram illustrating a method for controlling motor and engine torques when an engine is restarted after releasing an idle-stop state in a hybrid electric vehicle in accordance with embodiments of the present invention.
Figure 2:
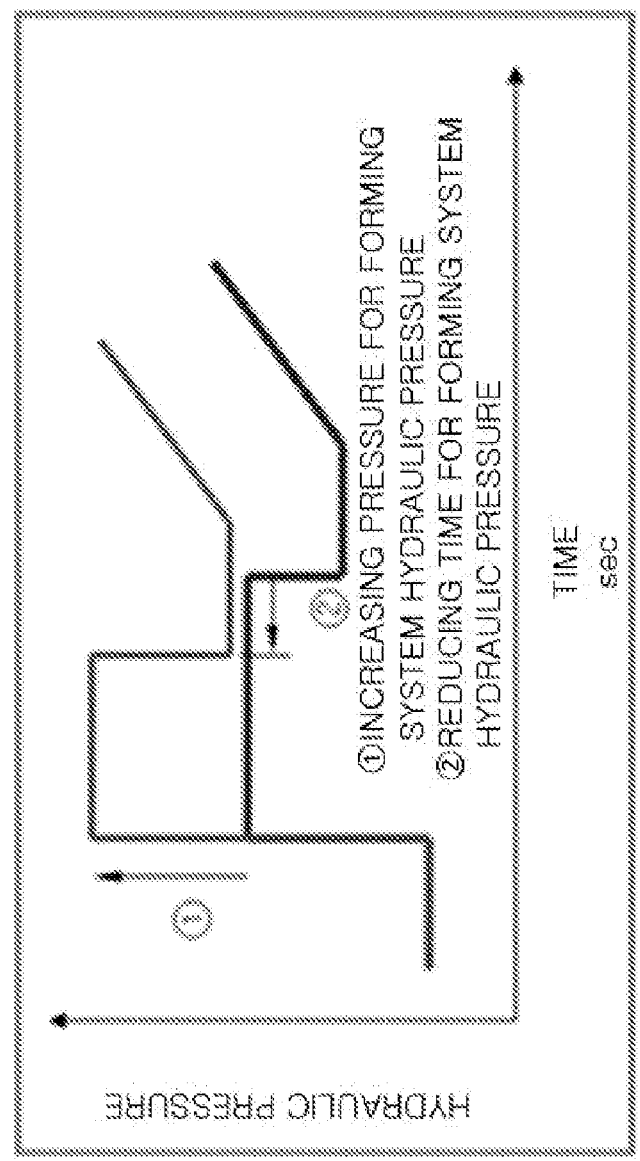
FIG. 2 is a graph illustrating a clutch hydraulic pressure control method in a torque control method in accordance with embodiments of the present invention.
Figure 3:
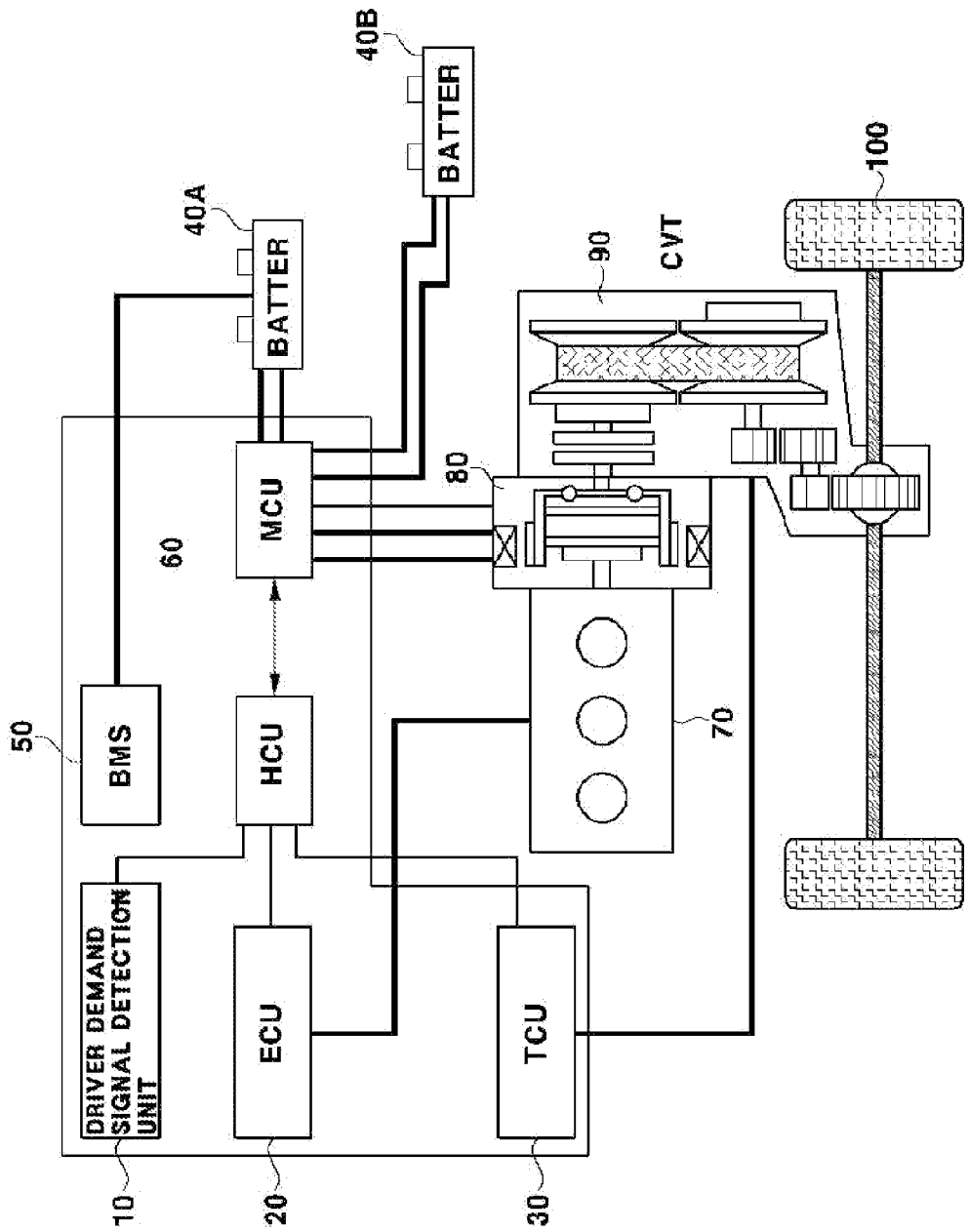
FIG. 3 is a schematic diagram illustrating a control system in a hybrid electric vehicle in accordance with embodiments of the present invention.

Reference numerals set forth in the Drawings include reference to the following elements as further discussed below:

| | |
|---|---|
| 10: | driver demand signal detection unit |
| 20: | ECU |
| 30: | TCU |
| 40A: | main battery |
| 40B: | auxiliary battery |
| 50: | BMS |
| 60A: | HCU |
| 60B: | MCU |
| 70: | engine |
| 80: | motor |
| 90: | CVT |
| 100: | wheels |

DETAILED DESCRIPTION OF PREFERRED EMBODIMENTS

Reference will now be made in detail to preferred embodiments of the present invention, examples of which are illustrated in the drawings attached hereinafter, wherein like reference numerals refer to like elements throughout. The embodiments are described below so as to explain the present invention by referring to the figures.

A hybrid electric vehicle in accordance with the present invention comprises a driver demand signal detection unit 10, an engine control unit (ECU) 20, a transmission control unit (TCU) 30, a main (high voltage) battery 40A, an auxiliary battery 40B, a battery management system (BMS) 50 that manages states of charge (SOC) of the main battery 40A, a hybrid control unit (HCU) 60A, a motor control unit (MCU) 60B, an engine 70, a motor 80, a continuously variable transmission (CVT) 90 and wheels 100.

The driver demand signal detection unit 10 detects driver demand signals, such as a start demand signal, an accelerator pedal sensor (APS) signal, a brake pedal signal, etc., and outputs electrical information corresponding thereto.

The ECU 20 controls various engine operations in accordance with the driver demand signals, engine state information such as coolant temperature, engine torque, etc.

The TCU 30 detects information such as current vehicle speed, gear ratio, clutch state, etc., to control overall operations of the CVT 90.

The main battery 40A supplies voltage to a hybrid motor for an initial start-up, supports an output power of the motor 80 while driving, and is charged by a regenerative braking energy recovered from the motor 80 that operates as an electric generator during brake control.

The auxiliary battery 40B supplies an initial starting voltage to a starter motor if the outdoor air temperature and the state of charge (SOC) of the main battery 40A do not meet initial start-up conditions, and is charged by a generated voltage of the motor 80 while the engine 70 operates.

The BMS 50 detects information on voltage, current, temperature, etc. of the main battery 40A to manage the states of charge (SOC) of the main battery 40A and controls an output current amount while supporting the output power of the motor 80.

The HCU 60A is a superior controller that controls the other controllers. The HCU 60A determines whether the vehicle condition is in an electric generation control mode or in a regenerative braking electric generation mode. If determined as an idle electric generation control mode, the HCU 60A charges the auxiliary battery 40B with the voltage generated in the motor 80 through an inverter.

Moreover, the HCU 60A determines an increase or decrease in an electric generation torque based on whether or not an air conditioner system is operating in the idle electric generation mode, and releases the electric generation torque upon detecting an intention of the driver to start the vehicle so as to assist acceleration of the vehicle.

The MCU 60B outputs torque control commands to the motor 80 in accordance with control signals applied from the HCU 60A to generate power and electricity during brake control, and maintains an appropriate charging states of the batteries at all times.

Moreover, in a case where the initial start-up is attempted, preferably, when the starter motor is operated by the voltage of the auxiliary battery 40B, the MCU 60B measures a voltage drop of the auxiliary battery 40B from a voltage input terminal of the auxiliary battery 40B and a start input terminal of an ignition key to check voltage of the auxiliary battery 40B.

If the voltage of the auxiliary battery 40B cannot ensure startability, the MCU 60B restricts the idle-stop for an appropriate time period during brake control by a brake pedal and increases an idle RPM, if necessary, thus charging the auxiliary battery 40B.

Output power of the engine 70 is controlled by the ECU 20, and an intake air amount of the engine 70 is controlled by an electronic throttle control (ETC).

The motor 80 is a brushless DC (BLDC) motor. If a drive demand signal is detected, the motor 80 is driven by the voltage of the main battery 40A or the auxiliary battery 40B according to the conditions to start the engine 70. Moreover, the motor 80 supports power while driving with the output power of the engine 70.

The CVT 90 adjusts its gear ratio in accordance with a control of the TCU 30 and transmits the power from the motor 80 to the wheels 100 through a differential gear.

In more detail, the ECU 20 controls an idle electric generation torque of the engine 70 in accordance with the driver demand signals, the engine state information such as coolant temperature, engine torque, etc., and the control of the HCU 60A.

Next, a torque control method after the idle-stop state in a hybrid electric vehicle in which an electronic throttle control type engine is mounted, will be described in a sequential order.

First, the HCU 60A transmits torque restriction information to the ECU 20 through a CAN communication when the vehicle enters the idle-stop state. The torque restriction information is based on engine coolant temperatures.

The torque restriction information is provided up to the time when the TCU 30 detects an engagement (the point of time when a clutch operates). When the engagement is detected, the HCU 60A starts releasing the torque restriction with a gradient for a predetermined time period. If the engagement is not detected, the HCU 60A releases the torque restriction after a predetermined time period to retransmit torque restriction information to the ECU 20. Subsequently, the ECU 20 outputs a restricted torque using the torque restriction information received from the HCU 60A.

Next, the motor torque is controlled by the MCU 60B so that an input torque of the engine that outputs only the restricted torque is transmitted to the CVT 90 by an operation of the clutch.

Accordingly, as the TCU forms a clutch control hydraulic pressure as soon as possible based on the torque information, it is possible to increase the clutch control hydraulic pressure and reduce the time taken to form the clutch control hydraulic pressure.

As a result, the engine torque is output and thereby the TCU increases the clutch control hydraulic pressure immediately based on the fixed torque information, thus reducing the response delay when the engine is restarted after the idle-stop state.

As described above, the method for controlling engine torque of a hybrid electric vehicle, in which an ETC device is mounted, reduces the response delay remarkably when the engine is restarted after releasing an idle-stop state and increases the clutch control hydraulic pressure immediately.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling engine torque of a hybrid electric vehicle with an electronic throttle control when an engine is restarted after an idle-stop state, the method comprising:

transmitting torque restriction information to an engine control unit;

outputting a restricted torque from the engine control unit using the torque restriction information;

transmitting an input torque of the engine to a continuously variable transmission by a clutch operation according to a control of the engine control unit; and supplying a clutch control hydraulic pressure based on the input torque;

wherein the torque restriction information is transmitted until a clutch operates; and wherein if the clutch does not operate, the torque restriction is released after a predetermined time.

* * * * *